(No Model.)　　　　　　　　　　　　　　　　　　2 Sheets—Sheet 1.
R. B. CODLING.
POLISHING MACHINE.
No. 373,882.　　　　　　　　　　Patented Nov. 29, 1887.
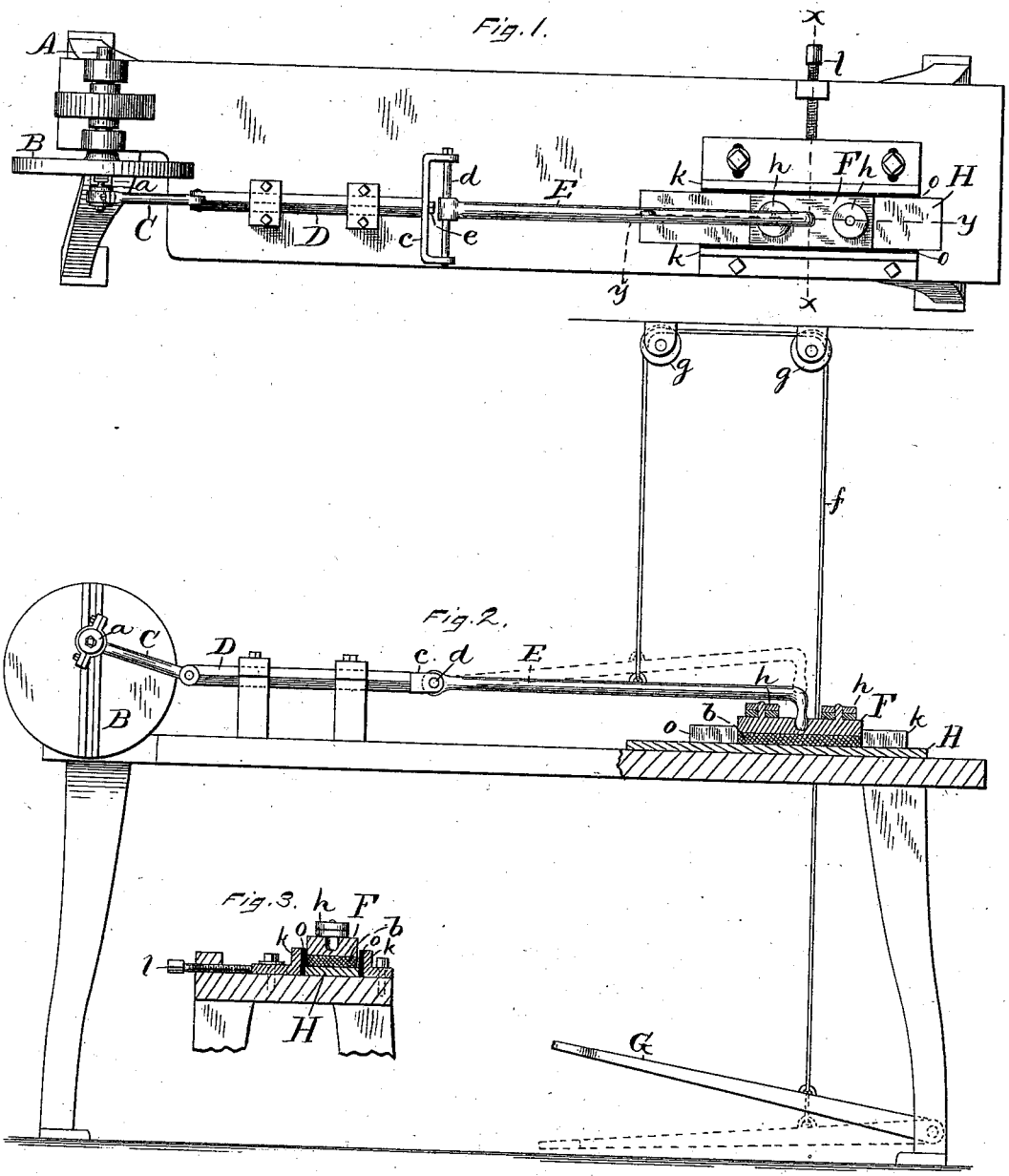
Witnesses.　　　　　　　　　　　　　　Inventor.
John Edwards Jr　　　　　　　　　　Robert B. Codling.
C. W. Welles　　　　　　　　　　By James Shepard
　　　　　　　　　　　　　　　　　　　　　　Atty.

(No Model.) 2 Sheets—Sheet 2.
R. B. CODLING.
POLISHING MACHINE.
No. 373,882. Patented Nov. 29, 1887.
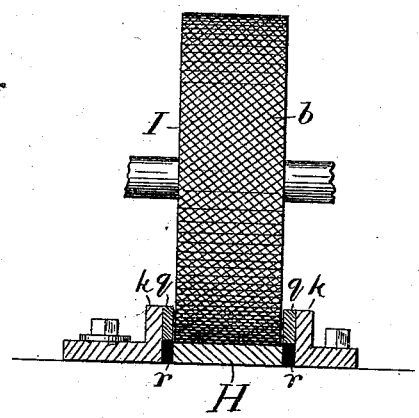
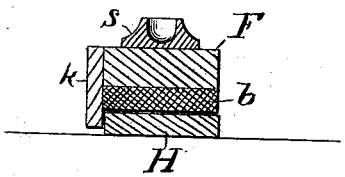
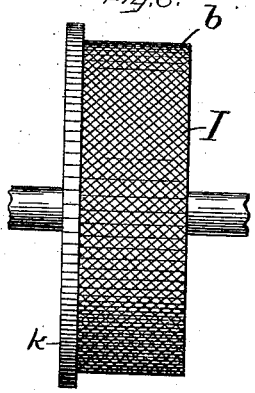
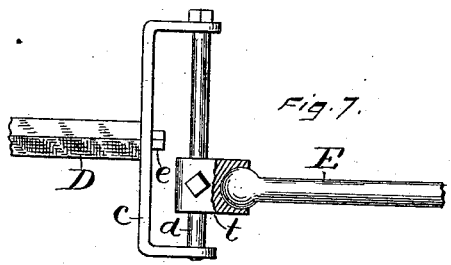
Witnesses.
John Edwards Jr.
C. W. Welles
Inventor.
Robert B. Codling
By James Shepard
Atty.

UNITED STATES PATENT OFFICE.

ROBERT B. CODLING, OF BRISTOL, CONNECTICUT.

POLISHING-MACHINE.

SPECIFICATION forming part of Letters Patent No. 373,882, dated November 29, 1887.

Application filed June 16, 1886. Serial No. 205,308. (No model.)

*To all whom it may concern:*

Be it known that I, ROBERT B. CODLING, a citizen of the United States, residing at Bristol, in the county of Hartford and State of Connecticut, have invented certain new and useful Improvements in Polishing-Machines, of which the following is a specification.

My invention relates to improvements in polishing-machines of the class designed for polishing varnished or japanned surfaces; and the objects of my improvement are to protect the corners of the work being polished, to regulate the pressure on the work, and to otherwise improve the efficiency of the machine.

In the accompanying drawings, Figure 1 is a plan view of a machine which embodies my invention. Fig. 2 is a side elevation, partly in longitudinal section, on line $y\,y$ of Fig. 1. Fig. 3 is a transverse section on line $x\,x$ of Fig. 1. Fig. 4 is an enlarged sectional view of parts of my machine, showing a rotary rubber in place of the reciprocating rubber shown in the preceding views. Fig. 5 shows a safe edge attached to a reciprocating rubber. Fig. 6 shows in side elevation a rotary rubber provided with a safe edge; and Fig. 7 is a side elevation, partly in section, showing a connection for the reciprocating slide and rubber-bar.

A designates the driving-shaft, having at one end a grooved crank-wheel, B, in which is the adjustable crank-pin $a$. To this crank-pin the pitman C is connected, which pitman is connected to and drives the reciprocating slide D. This slide has connected to it the rubber-bar E for driving the rubber F, the latter having felt $b$ or other suitable material for carrying abrading-powder, secured to its under face. This rubber-bar E is connected to the slide D by means of a frame, $c$, carrying a rod, $d$, to which the bar E is pivoted, and may be slipped from end to end of the frame on said rod. This frame $c$ is connected to the slide D by means of a single bolt, $e$, Fig. 1, whereby the frame may be swiveled and set in any desired position.

The rubber F is provided with an open socket on its top, into which the forward end (which is turned downward, as shown in Fig. 2) of the rubber-bar E enters when said bar is allowed to fall into it, as shown. I prefer to arrange this rubber-bar with some mechanism for lifting it out of the socket in the rubber F, for removing said rubber for any purpose. The mechanism illustrated for so raising the bar is shown in Fig. 2, and consists of the treadle G and cord $f$ passing over pulleys $g\,g$, secured to some proper support above the bar, said cord being attached by one end to the bar and by the other end to the treadle, so that depressing the treadle will lift the bar out of the socket, as indicated by broken lines in Fig. 2. A simple catch may be placed near the treadle, if desired, to hold the treadle down, and thereby hold the bar in its elevated position. In this construction the rubber-bar and rubber are allowed to fall into working position by gravity, instead of being forced against the work by pressure from a treadle or other mechanism manipulated by the operator.

In order to vary the pressure and regulate it to the work being done, I provide the rubber with pins or studs to which weights $h$ may be attached and detached so as to get just the exact amount of pressure desired, and also so as to apply the most pressure to one end of the rubber F, if desired. For the purpose of increasing the weight upon the whole rubber, like pins or other weight-supporting devices may be attached to the rubber-bar E, so that said bar can be weighted with all the nicety required. By these means the pressure upon the rubber can be made uniform for any given piece of work, whereas, when the pressure is applied by the muscular force of the operator, it is impossible to apply uniform pressure at all times to any given piece of work.

In order to prevent injury or grinding off the corners of the work H, I provide safe edges $k$. In one form of my invention these safe edges take the form of clamps, as in Figs. 1 to 4, inclusive, which serve to hold the work and which may be forced upon it by means of the clamp-screw $l$. With this form of safe edge I prefer to line them with some suitable material, as indicated by the lining $o$ in Figs. 1, 2, and 3, or by a lining composed of two materials—for instance, a plate of brass or soft metal, $q$, Fig. 4, and an elastic material, $r$, being arranged opposite the work for clamping it, while the soft metal or brass $q$ projects above the work and forms guides to prevent the felt or elastic coating of the rubber $b$ from being spread outwardly so as to grind off the corners of the work being polished. This metal and rubber lining should be made attachable and detachable, so that different widths may be applied for work of different thicknesses. The lining in either case becomes the face, and therefore a part of the safe edge.

The work may be clamped in one position, and a portion, or its whole length, polished under the reciprocating action of the rubber, or the rubber may be made to make short and rapid reciprocations and the work may be fed gradually through between the safe edges or guides, and thereby receive the proper polish.

Instead of making the guides or safe edge stationary, a like effect may be produced by attaching a safe edge directly to one or both sides of the rubber. When attached to only one side, as shown in Fig. 5, the width of the rubber should be nicely adjusted to the width of the work, so that it will rub up to the corner opposite the safe edge, but will not overlap said corner to grind it off.

Instead of forming the socket for the end of the rubber-bar directly in the top of the rubber F, it may be formed in a separate piece, s, and secured to said rubber, as shown in Fig. 5.

Instead of a reciprocating rubber the corners may be protected by a safe edge or edges when a rubber-wheel, I, having a coating of felt or other substance suitable for carrying the abrading material, is employed, as shown in Figs. 4 and 6.

In order that the bent end of the rubber-bar E may be turned in any desired direction, I have illustrated in Fig. 7 an improvement in the connecting-frame, in which the rubber-bar, instead of having an eye through which the rod d passes formed solid on its end, is connected to an eye, t, by means of a ball-and-socket joint, whereby the rubber-bar may be universally adjusted to rub the work, whose surface lies in any inclination, or may be adjusted up or down for accommodating thicker work, or more or less to one side, as may be desired.

I claim as my invention—

1. In a polishing-machine, the combination of the bed upon which the work is held, the rubber b, the safe edge k, whose inner face is located at the corners of said rubber and the work, and is extended in a plane by the vertical sides of said rubber and work in contact with the latter when said work is within the machine for preventing the rubber from spreading over the corners of the work, substantially as described.

2. In a polishing-machine, the combination of the yielding rubber, the safe edges adapted to open and close, to adjust them to the work, and means for clamping said safe edges in place, with their faces bearing against the side edges of the work, the safe edges also projecting above the work, to protect the corners thereof under the action of the rubber while working between said safe edges, substantially as described, and for the purpose specified.

3. As a means for operating a reciprocating rubber, the combination of a reciprocating slide, D, a rubber-bar connected thereto by means of a joint, and the rubber F, having an open socket for supporting removably the end of said bar, substantially as described, and for the purpose specified.

4. The combination of a reciprocating bar, the swiveled connecting-frame c, bearing-rod d, and the rubber-bar E, hinged to said rod, substantially as described, and for the purpose specified.

5. The combination of a reciprocating slide, swivel-frame c, connected thereto, the rod d, the eye t, adjustable on said rod d, and the rubber-bar E, connected to said eye by means of a ball-and-socket joint, substantially as described, and for the purpose specified.

6. In a polishing-machine, the combination of adjustable safe-edge guides adapted to clamp the work between them, and the lining composed of an elastic part, r, for extending up to the surface of the work being polished, and a rigid part, q, above said surface at the sides of the rubber, substantially as described, and for the purpose specified.

ROBERT B. CODLING.

Witnesses:
L. ROBERTS,
JOHN T. CROSS.